United States Patent

[11] 3,523,551

| [72] | Inventor | William C. Schmitt |
| --- | --- | --- |
| | | Brown Deer, Wisconsin |
| [21] | Appl. No. | 713,631 |
| [22] | Filed | March 18, 1968 |
| [45] | Patented | Aug. 11, 1970 |
| | | continuation-in-part |
| | | of Ser. No. 437,695, filed |
| | | Mar. 8, 1965, |
| | | abandoned. |
| [73] | Assignee | Milwaukee Faucets, Inc. |
| | | Milwaukee, Wisconsin |
| | | a Corp. of Wisconsin |

[54] FAUCET CONSTRUCTION
1 Claim, 3 Drawing Figs.

[52] U.S. Cl.................................................... 137/454.6,
251/214, 277/102
[51] Int. Cl............................................................ F16k 27/00
[50] Field of Search............................................ 137/454.5,
454.6; 251/214; 277/102

[56]         References Cited
         UNITED STATES PATENTS

| 209,160 | 10/1878 | Deavs...................... | 251/214X |
| --- | --- | --- | --- |
| 1,223,327 | 4/1917 | Marsh........................ | 251/214X |
| 1,856,088 | 5/1932 | Brown........................ | 137/454.6 |
| 2,202,114 | 5/1940 | Morf........................... | 277/102X |
| 2,223,567 | 12/1940 | Kersten..................... | 137/454.6 |
| 2,486,215 | 10/1949 | Shields....................... | 137/454.5 |
| 2,980,390 | 4/1961 | Anderson................... | 251/214X |
| 3,160,390 | 12/1964 | Banks......................... | 137/454.1X |

Primary Examiner— Harold W. Weakley
Attorney— Lieber and Nilles

ABSTRACT: A faucet wherein the valve and all attendant moving parts comprise a unitary readily accessible and removable assembly and a highly efficient independently functioning seal is provided between the stuff nut, valve stem and valve body.

Patented Aug. 11, 1970

3,523,551

INVENTOR
WILLIAM C. SCHMITT

BY Lieber & Nilles
ATTORNEYS

FAUCET CONSTRUCTION

CROSS-REFERENCES

This application is a continuation-in-part of United States Patent application Serial No. 437,695, filed March 8, 1965 and now abandoned in the name of William C. Schmitt.

BACKGROUND

Faucets of the type to which this invention is directed employ a valve body having an inlet for pressurized fluid, an outlet and a valve controlled port therebetween. The control of the fluid flow is obtained by opening or closing the port by means of the valve upon rotation of a valve stem mounted in the valve body. This moves the valve selectively toward or away from its seat adjacent the port. The opening through which the valve stem extends for operating the valve normally is capped by a stuff nut. The stuff nut, when applied to and tightened on the valve body, generally compresses various sealing means or packings to prevent leakage between the opening in the valve body and the stuff nut and between the stuff nut and the valve stem.

As shown and described in United States Patent No. 1,640,527, dated August 30, 1927 to A. C. Brown, it has heretofore been proposed to provide a faucet in which the movable parts are arranged as a unit for ready removal from the faucet body. In such prior assemblage, removal of the entire valve assemblage and actuating mechanism for repair or replacement was greatly facilitated, and these devices have accordingly enjoyed favorable acceptance and a considerable degree of commercial success. However, the means for sealing against undesirable leakage of the fluid under pressure either past the valve or about the valve actuating stem and stuff nut has left something to be desired.

In the faucet assemblages hereinabove described, a compressible packing is employed in the stuff nut about the valve actuating stem, and to be at all effective, it was necessary to compress this packing. Thus, the tightening action applied to the stuff nut was quite critical. If the stuff nut was not tightened sufficiently, the valve would leak either along the stem between the valve body and the stuff nut, or along the stuff nut screw threads or between the valve seat and the valve port. Additonally, upon rotation of the stem to operate the valve, the stuff nut and the sleeve also turned if the former was not properly tightened on the valve body, and if the stuff nut was tightened sufficiently to adequately compress the packing and prevent leakage or loosening, the valve and its actuating mechanism often became extremely hard to operate because of the resistance established by compression of the packing or seals along the stem.

Hence, it has heretofore been necessary to machine the parts of the valve, particularly the opening in the valve body, the stuff nut, and the valve stem to extremely close tolerance to permit the stuff nut to be tightened sufficently to prevent leakage while at the same time permitting the valve to operate freely. Furthermore, it has been necessary to periodically adjust the tightness of the stuff nut to compensate for wear of the packing, seals, or other parts of the valve, and even then, the resistance to rotation of the valve actuating handle due to the compression of the packing has persisted through past years.

SUMMARY

The present invention provides an improved faucet and valve assemblage in which the sealing means for effecting the seal between the valve stem, valve body and the stuff nut is entirely independent and is not in any way affected by any tightening action which might be applied to the stuff nut. This permits the stuff nut to be tightened to any extent sufficient to prevent leakage between the stuff nut and the valve body and between the valve seat and the valve port without affecting operation of the valve actuator.

In addition, the sealing means in the improved valve of this invention is readily accessible for replacement or adjustment independently of the valve and its attendant parts.

Furthermore, the sealing means automatically compensates for wear so that the stuff nut need not be subsequently tightened or otherwise adjusted to provide for effective sealing about the valve stem.

Generally speaking, the invention is especially adapted for use in a faucet having a fluid pressure inlet and an outlet and provided with an externally threaded shank having a central bore extending therein and communicating with the inlet and outlet. A unitary valve assemblage is receivable within the bore of the faucet shank and comprises generally a cylindrical valve body or sleeve having internal screw threads for adjustably receiving an externally threaded valve stem. The sleeve has an inlet port and an annular valve seat at its inner end, and the adjacent inner end of the valve stem carries a disc-shaped valve adapted to control flow of pressurized fluid through the inlet port. The opposite end of the valve stem protrudes outwardly above the faucet shank for reception of an actuating or gripping handle, and the faucet shank is, in turn, capped by a stuff nut received on the externally threaded portion thereof to close and seal the opening above the valve assemblage and about the protruding valve actuating stem. In accordance with the invention, the stuff nut is provided with an inwardly open cylindrical recess surrounding the valve stem and adapted to receive a sealing assemblage which includes a resilient O-ring, a non-resilient floating ring coacting with the O-ring and a force applying spring coacting with the floating ring to transmit a compressive force to the O-ring.

THE DRAWINGS

A clear conception of the features constituting the present improvements and of the construction and mode of operation of a typical faucet and valve assemblage embodying the improved sealing mechanism as constructed in accordance with the invention may be had by referring to the drawing accompanying and forming a part of this specification wherein like reference characters designate the same or similar parts in the several views.

DETAIL DESCRIPTION

Figure 1:
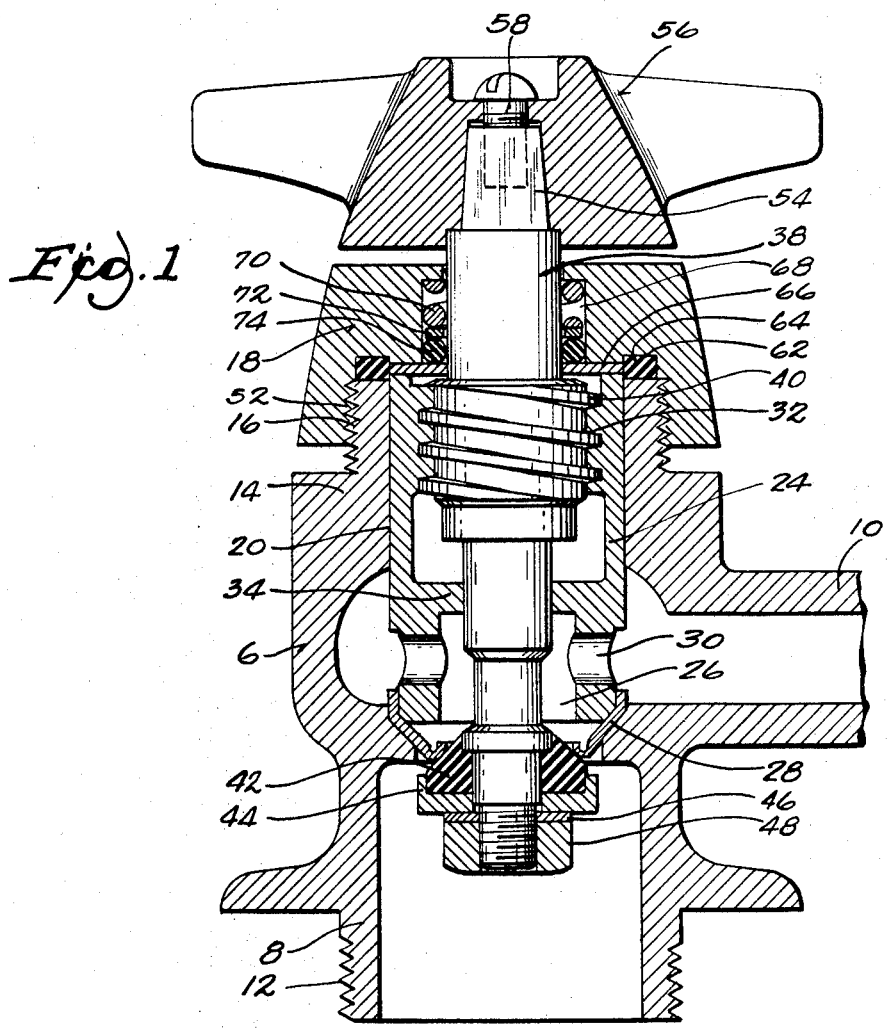
FIGURE 1 is generally a central vertical section through a typical faucet and control valve assemblage embodying the improved stuff nut seal.

Referring to the drawing, FIGURE 1 shows a typical lavatory faucet assemblage embodying the invention. The faucet fitting comprises a valve casing portion 6 having an inlet connection 8 communicating with an outlet spout 10. The inlet connection is threaded as at 12 for attachment to a fluid pressure supply line, and the valve casing portion 6 has a shank 14 extending therefrom and provided with external screw threads 16 for receiving an internally threaded stuff nut 18. The threaded shank 14 has a central bore 20 extending therein and communicating with the inlet 8 and outlet 10.

The unitary valve assemblage for the faucet comprises generally a cylindrical body or sleeve 24 snugly but removably received within the bore 20. The lower end of the sleeve member 24 has an inlet port 26 formed therein and an annular valve seat 28 is secured to the end of the sleeve 24 adjacent to and about the inlet port 26. The sleeve 24 is also provided with an outlet port 30 communicating with the faucet spout 10, and the medial portion of the sleeve 24 is additionally internally threaded as at 32, the threaded portion being segregated from the inlet and outlet ports 26, 30 as by a partition 34.

Received within and extending through the sleeve 24 is a valve stem 38 having exterior threads 40 coacting with the internal threads 32 of the sleeve. The lower end of the valve stem 38 extends through a central aperture in the partition 34 and through the inlet port 26 to a point beyond the valve seat 28, and the end of the stem has a disc-shaped valve member 42 mounted thereon. The valve member 42 may be suitably mounted on the stem 38 as by means of a cup-shaped retaining member 44, washer 46 and nut 48 threaded to the lower end of the stem. The disc-shaped valve member 42 thus carried by the stem 38 is adapted to seat against the valve seat member 28 to arrest flow of fluid from the pressure source through the ports 26, 30, and fluid is admitted through the ports 26, 30 upon unseating of the valve member 42.

The end of the valve stem 38 remote from the valve member 42 carried thereby extends outwardly beyond the end of the faucet shank 14, and the stuff nut 18 surrounds the extending portion of the stem and is removably secured to the threaded portion 16 of the faucet shank by means of internal screw threads 52. The extreme outer end of the stem 38 above the stuff nut 18 is squared as at 54 to receive an actuating knob or handle 56 shown as attached to the squared end of the shaft by means of a screw 58. Thus, the actuating knob 56 is readily removable by first removing the screw 58, and the stuff nut 18 may then be removed by unscrewing the same from the threaded end of the shank 14. Thereupon, the valve assemblage as carried by the cylindrical body or sleeve 24 may be readily removed outwardly through the bore 20.

In accordance with the present invention, the stuff nut or cap 18 is provided with an annular internal groove 62 adjacent and immediately above the threaded end of the shank 14 and surrounding the area defined by the bore 20 and the sleeve 24, and an annular resilient sealing member 64 is confined within the groove 62 so as to co-act with the adjacent end of the shank. Surrounding the stem 38 within the area defined by the stem and the inner periphery of the sealing member 64 is an annular metallic washer 66 providing a seat for the adjacent end of the sleeve 24. The stuff nut 18 is formed with an inwardly open cylindrical recess 68, and confined within the recess 68 is a helical compression spring 70 compressed between the inner end of the recess and an annular washer or bearing member 72 which is loosely received within the recess 68 so as to permit free floating movement. An O-ring seal 74 is also confined within the recess 68 between the floating disc 72 and the disc or washer 66, and since the disc 66 is seated directly against the adjacent inner surface of the stuff nut 18 surrounding the recess 68 which is of fixed predetermined depth, the compression of the spring 70 acting against the resilient O-ring 74 through the floating member 72 remains constant at all times and there is never any variation in the effectiveness of the stuff nut seal once the stuff nut 18 has been applied to the threaded shank 14.

Figures 2, 3:
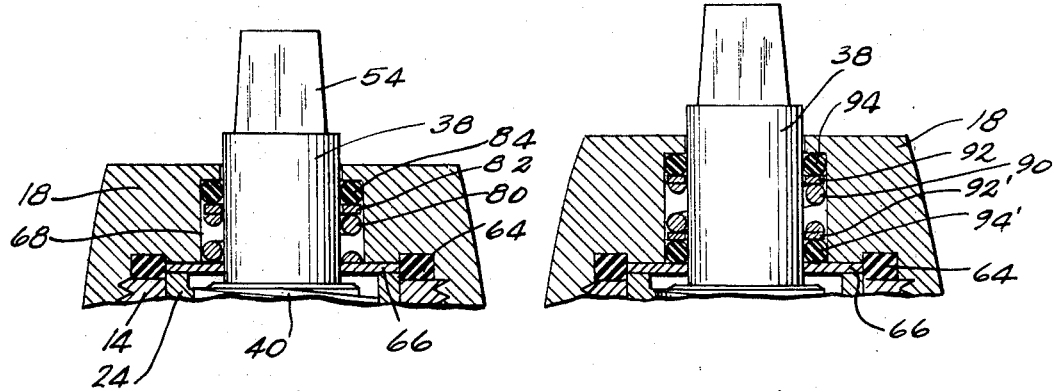
FIGURE 2 is a fragmentary section through a stuff nut and the adjacent components but showing another embodiment of the invention wherein the seal and its attendant parts are reversed.
FIGURE 3 is a similar fragmentary section through a stuff nut showing another somewhat modified sealing arrangement.

In the embodiment of FIGURE 1, the sealing arrangement within the recess 68 of the stuff nut 18 is as described with the resilient O-ring seated against the metallic disc washer 66 and receiving compressive force through the floating ring 72 from the compression spring 70 positioned between the ring 72 and the end wall of the recess. However, this sealing arrangement may be reversed if desired as shown in the embodiment of FIG. 2. In FIG. 2, the stuff nut 18 is of the same construction hereinabove described with respect to FIG. 1 with the valve actuating stem 38 extending therethrough and being embraced by a metallic washer 66 which is bounded by an annular sealing ring 64 confined within the annular groove 62. The stuff nut is again formed with a cylindrical recess 68 which is freely open at its inner end to the metallic washer 66, the recess being of predetermined depth. However, in the arrangement of FIG. 2, the O-ring seal now designated 84 is seated against the inner end wall of the recess with the spring 80 seated against the washer 66 and with the floating ring 82 disposed between the O-ring and spring. While the parts in this embodiment are reversed, the effectiveness of the seal is not in any way affected and all of the components of the sealing assemblage again function independently of any of the other components and the effectiveness thereof is constant and without variation.

If desired, a pair of O-ring seals 94, 94' may be utilized in the stuff nut sealing arrangement, and such embodiment is shown in FIG. 3. As shown, one of the O-ring seals 94 may be seated against the end wall of the recess and other O-ring seal 94' seated against the washer 66 with a suitable spring 90 interposed between and acting thereon through a pair of floating rings 92, 92'. The particular embodiment shown in FIGURE 3 might be found useful in instances wherein the pressure conditions are abnormally high and in instances wherein a stuff nut or cap of greater depth may be utilized.

However, in all of the embodiments shown and described herein, the compressive force of the spring as transmitted to the O-ring seal remains of a constant predetermined quality since the stuff nut seal functions entirely independently of any of the other components of the faucet and is absolutely unaffected either by the movement of the valve actuating stem 38 or by the tightening of the stuff nut or cap 18. In addition, there is no direct relationship with respect to the location of the valve seat 28 relative to the stuff nut seal, and it is therefore unnecessary to provide close machining tolerances to insure proper seating of both the stuff nut and the valve assemblage. In each case, the recess 68 in the stuff nut or cap is of a predetermined depth closed at its inner open end by the metallic washer 66, and in order to obtain access to the sealing components, it is only necessary to remove the stuff nut from the faucet shank 14 in an obvious manner and all of the parts are thereupon rendered readily accessible.

I claim:

1. A faucet assemblage comprising, a faucet comprising a valve housing and having an inlet communicable with a source of pressurized fluid, an outlet communicable with the inlet and a threaded shank having a central bore communicating with both the inlet and the outlet, a cylindrical valve body having an internal threaded portion and being removably housed within the bore of said shank, said valve body being provided with an annular valve seat at its inner end sealing the housing inlet, a valve stem extending through said cylindrical valve body and having threads received by the internal, threaded portion thereof, said stem being provided with a valve closure member at its inner end cooperable with said valve seat for controlling fluid flow, a non-resilient disc surrounding said stem and seated directly against the end of said valve body remote from said valve seat, said remote end of said valve body extending outwardly of said valve housing to form a first recess, a stuff nut embracing said stem remote from said valve closure member and removably received by the threaded shank, the inner wall of said stuff nut being seated directly against said non-resilient disc and having a cylindrical recess extending outwardly therein surrounding said stem, said non-resilient disc extending radially inwardly adjacent to said stem to close said recess, said stuff nut having an annular groove in its said inner wall spaced radially from said cylindrical recess to conform in size to said first recess and surroundingly adjacent said non-resilient disc, said groove extending outwardly beyond said disc; a sealing member in said groove and in sealing engagement with the periphery of said non-resilient disc, said stuff nut valve housing and valve body; a helical spring surrounding said valve stem within the cylindrical recess of said stuff nut, an O-ring seal also surrounding said valve stem within the cylindrical recess, and a non-resilient ring freely received within the annular recess about said stem between said spring and said O-ring seal, whereby said spring transmits a compressive force to the O-ring seal through said ring.